(12) United States Patent
Noak et al.

(10) Patent No.: US 9,012,002 B2
(45) Date of Patent: Apr. 21, 2015

(54) HOT-MELT ADHESIVE UNIT OF AN ADHESIVE BONDING ARRANGEMENT

(75) Inventors: Jens Noak, Kaufering (DE); Egon Wezstein, Stockdorf (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 13/084,146

(22) Filed: Apr. 11, 2011

(65) Prior Publication Data

US 2012/0288658 A1  Nov. 15, 2012

(30) Foreign Application Priority Data

Apr. 19, 2010 (DE) .......................... 10 2010 015 408

(51) Int. Cl.
*B32B 9/00* (2006.01)
*B32B 33/00* (2006.01)
*C09J 5/06* (2006.01)

(52) U.S. Cl.
CPC ............... *C09J 5/06* (2013.01); *Y10T 428/187* (2015.01); *Y10T 428/14* (2015.01); *Y10T 428/183* (2015.01); *Y10T 428/18* (2015.01); *C09J 2201/61* (2013.01)

(58) Field of Classification Search
CPC ............ C09J 5/05; C09J 2201/61; C09J 5/06; Y10T 428/14; Y10T 428/18; Y10T 428/187; Y10T 428/183

USPC ....................... 428/40.1, 54, 55, 56
See application file for complete search history.

(56) References Cited

U.S. PATENT DOCUMENTS

| | | | |
|---|---|---|---|
| 5,188,256 A * | 2/1993 | Nottingham et al. | 222/1 |
| 5,433,804 A * | 7/1995 | Nottingham et al. | 156/71 |
| 6,858,285 B1 * | 2/2005 | Hamilton et al. | 428/174 |
| 2008/0078500 A1* | 4/2008 | Sher et al. | 156/289 |
| 2009/0104448 A1* | 4/2009 | Thompson et al. | 428/413 |

FOREIGN PATENT DOCUMENTS

| | | |
|---|---|---|
| DE | 44 44546 A1 | 7/1995 |
| DE | 10 032817 A1 | 1/2002 |
| DE | 10 2007 048 022 A1 | 4/2009 |
| EP | 14 03108 A1 | 3/2004 |
| EP | 21 10419 A1 | 10/2009 |

* cited by examiner

*Primary Examiner* — Patricia L Nordmeyer
(74) *Attorney, Agent, or Firm* — Fitch, Even, Tabin & Flannery LLP

(57) ABSTRACT

A hot-melt adhesive unit of an adhesive bonding arrangement for adhesively bonding a first component, for example a vehicle window, to a second component, for example a vehicle frame, wherein the hot-melt adhesive unit contains a hot-melt adhesive body having a base region and a head region, and the hot-melt adhesive body is at least partially bounded laterally in the base region thereof by a casing, and projects with the head region thereof, the head region forming the adhesive bond, beyond the casing.

16 Claims, 2 Drawing Sheets

HOT-MELT ADHESIVE UNIT OF AN ADHESIVE BONDING ARRANGEMENT

CROSS REFERENCE TO RELATED APPLICATIONS

This application claims priority to German patent application No. 10 2010 015 408.3 filed Apr. 19, 2010, the content of which is incorporated by reference herein in its entirety.

The invention relates to a hot-melt adhesive unit of an adhesive bonding arrangement for adhesively bonding a first component to a second component.

EP 2 110 419 A1 has disclosed a hot-melt adhesive unit of the type in question which is used in a method for adhesively bonding a first component to a second component. In this method, the second component has a border region to which the first component is adhesively bonded in an overlapping manner, wherein a) at least one hot-melt adhesive body is adhesively bonded, without heating thereof, to the first component with the aid of a further adhesive in such a manner that said body comes into contact with the border region when the first component is adhesively bonded to the second component,
b) the border region is locally heated indirectly or directly by electromagnetic induction to a temperature above the melting point of the hot-melt adhesive at at least one point at which the applied hot-melt adhesive body comes into contact with the border region during the adhesive bonding of the first component,
c) the first component makes contact with the border region of the second component in such a manner that the hot-melt adhesive body comes into contact with that point of the border region which is heated in step b), and therefore the hot-melt adhesive melts at the contact point with the border region and, after cooling, connects the first component to the border region of the second component,
d) wherein, in addition, before step b) or after step c), a reactive adhesive is introduced between the first and the second component in such a manner that said adhesive connects the first component to the border region of the second component, and
e) the reactive adhesive is cured or allowed to cure.

The hot-melt adhesive body is shaped, for example, so as to have at least two approximately parallel surfaces, wherein the first of the parallel surfaces comes into contact with the first component and the second of the parallel surfaces comes into contact with the border region of the second component. The first component is, for example, a vehicle window and the second component is, for example, a body shell part or frame part of a vehicle or of a vehicle roof. EP 2 110 419 A1 does not contain more detailed information and explanations about the hot-melt adhesive body and the application and handling thereof. However, the handling of a hot-melt adhesive body of this type and the production of the adhesive bond appear to be comparatively complicated.

The invention is based on the object of improving a hot-melt adhesive unit mentioned at the beginning in respect of the construction and use thereof.

According to the invention, the object is achieved with a hot-melt adhesive unit mentioned at the beginning in that the hot-melt adhesive unit contains a hot-melt adhesive body having a base region and a head region, and in that the hot-melt adhesive body is at least partially bounded laterally in the base region thereof by a casing, and projects with the head region thereof, the head region forming the adhesive bond, beyond the casing.

Advantageous refinements of the invention are provided in the dependent claims.

The stable casing bounds the hot-melt adhesive body at the lower region or base region thereof and increases the stability thereof during handling and adhesive bonding. The hot-melt adhesive body preferably contains a parallelepiped or cuboidal shape with an upper side at the head region and a lower side at the base region, which sides are parallel to each other and are provided directly or indirectly for adhesive bonding to the first or second component, wherein at least one section of the head region melts by heating by means of induction or another supply of energy and produces an adhesive bonding connection. Should the base region also be softened by the supply of heat, the casing forms a boundary against the hot-melt adhesive yielding laterally. During the production of the adhesive bond of, for example, a window to a vehicle frame, for example by means of an adhesive bonding arrangement according to EP 1 403 108 A1, the hot-melt adhesive unit serves to preliminarily fix the window at individual points until a second adhesive bonding sealing compound has cured and the permanent adhesive bonding of the window is provided. The casing which at least partially surrounds the circumference of the base region and can also have a closed lower side forms a shaping boundary for the hot-melt adhesive during the production of the hot-melt adhesive unit and, owing to the defined height thereof, also forms a spacer for maintaining a minimum distance between the first component, for example a vehicle window, and the second component, for example a frame for holding the window, when the hot-melt adhesive on the head region of the hot-melt adhesive body melts.

Basically, any type of suitable boundary is referred to as a casing. In particular, however, the casing is not part of one of the two components to be adhesively bonded since the casing is supposed to be suitable for the adhesive bonding of different components and, in this context, is accordingly not supposed to be dependent on the type or design of the components. The hot-melt adhesive unit therefore has a dedicated component-independent casing, wherein the independent design thereof is understood as being component-independent and, although said design may be adapted for adhesive bonding to the components, the casing is nevertheless not an integral part of at least one of the components.

The casing is preferably therefore produced from a plastics material, the melting point of which is higher than the melting point of the hot-melt adhesive. A plastics material of this type is, for example, ABS or a comparable plastic. During the heating and melting of the hot-melt adhesive, the stable casing retains its shape.

In a preferred configuration, the hot-melt adhesive body is arranged with the base region thereof on a backing layer. The hot-melt adhesive unit can therefore be fixed or adhesively bonded to the first component via the stable backing layer before the hot-melt adhesive is melted to produce the adhesive bonding connection to the second component. The backing layer, for example a film in particular of aluminium, also provides strength making handling easier. The hot-melt adhesive or the hot-melt adhesive body is expediently extruded onto the backing layer, but may also be attached thereto in a different manner. The casing is preferably also attached fixedly to the backing layer, thus providing a constructional unit which is stable per se. The casing may also be extruded onto the backing layer.

The casing expediently holds the base region of the hot-melt adhesive body on the backing layer by means of form-fitting engagement. Said form-fitting engagement therefore supports the fastening of the hot-melt adhesive body to the backing layer and prevents a possible detachment of the hot-melt adhesive body from the backing layer in the event of defective fastening, for example because of the extrusion, prior to installation and melting adhesive bonding. A form-fitting engagement of this type can be formed, for example, by the casing being inclined from the backing layer towards the base region of the hot-melt adhesive body and keeping the latter clamped against the backing layer.

In a preferred configuration, the casing bounds the base region of the hot-melt adhesive body exclusively on two opposite sides. In principle, the hot-melt adhesive body can have a largely random shape coordinated with the use, but a parallelepiped and, in particular, a cuboidal shape are preferred. The advantages according to the invention are substantially also achieved already with this two-sided boundary. The production of the hot-melt adhesive unit can be simplified by said two-sided casing arrangement if, during the extrusion, a strip-like preform is formed, from which the individual hot-melt adhesive units are severed or cut.

If the backing layer on the side thereof facing the hot-melt adhesive body has an adhesive bonding means, in particular an adhesive layer or an adhesive tape, an additional application of adhesive is not requried in order to fasten the hot-melt adhesive unit to the first component. Said adhesive bonding means is expediently covered and therefore protected by means of a film which can be peeled off prior to use.

The hot-melt adhesive unit according to the invention which is used in addition to adhesively bonding the component, for example, by means of a polyurethane adhesive bead, can therefore be used in a simple manner in order to reduce the time for reaching the required handling strength to a minimum. When the window is arranged on the frame, the hot-melt adhesive of the hot-melt adhesive unit adhesively bonded to the window is melted so as to adhere to the frame upon subsequent cooling. In the process, an adhesive gap between the components which are to be adhesively bonded can be set individually according to the dimensional and installation tolerances of the two components.

The hot-melt adhesive is preferably melted by means of heat generated on a steel component or steel frame by induction, but the invention is not restricted to heat generation of this type.

The invention is explained in more detail below using two exemplary embodiments of hot-melt adhesive units according to the invention with reference to the drawing, in which.

Figure 1:
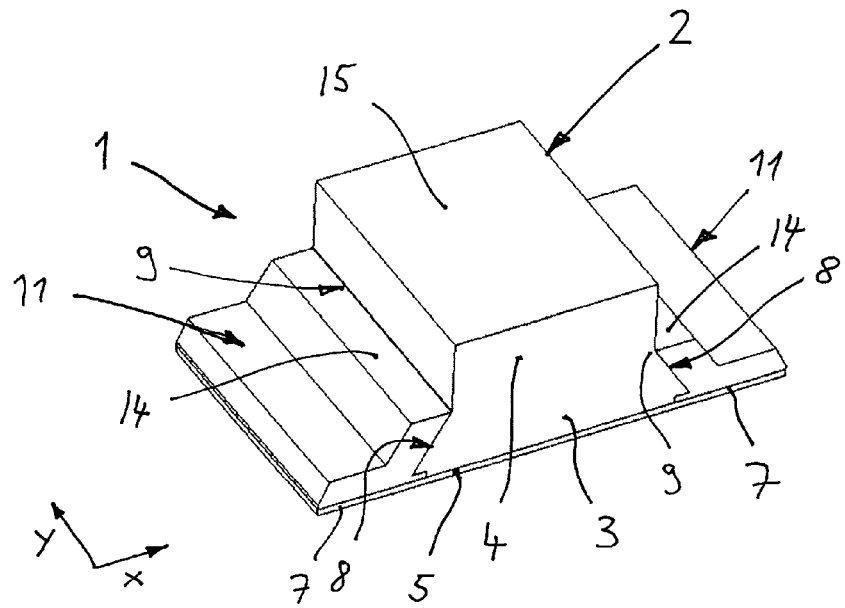
FIG. 1 shows, in a perspective top view, a first exemplary embodiment of a hot-melt adhesive unit.

A hot-melt adhesive unit 1 (see FIGS. 1 and 2) contains a hot-melt adhesive body 2 which is formed substantially cuboidally, has a base region 3 and a head region 4 and is applied with the base region 3 to a backing film 5. The backing film 5 protrudes on two opposite sides 6 of the hot-melt adhesive body 2 by a respective film section 7 over the base region 3 of the hot-melt adhesive body 2 in the width direction (x-direction according to FIG. 1) of the hot-melt adhesive unit 1. The base region 3 of the hot-melt adhesive body 2 widens on both of these opposite sides 6 towards the backing film 5 and is accordingly formed, for example, by two inclined outer surfaces 8 which begin at a respective transition line 9 to the head region 4 and extend downwards as far as the backing film 5 or end at respective recesses 10 which extend in the length direction (y-direction according to FIG. 1) over of the entire hot-melt adhesive body 2 and make the base region 3 narrower in the width direction adjacent to the backing film 5.

The two opposite sides 6 of the base region 3 of the hot-melt adhesive body 2 are each bordered by a casing 11. The casing 11 contains a fastening base 12 which is attached to the film section 7 of the backing film 5, which film section protrudes from the hot-melt adhesive body 2, and a boundary limb 13 which covers the outer surface 8. The two boundary limbs 13 end at the same height over the backing film 5 and in particular have surfaces 14 which lie in a common plane which is arranged in particular parallel to the backing film 5 and the upper side 15 of the hot-melt adhesive body 2 and contains the two transition lines 9.

The lower side of the backing film 5 has an adhesive layer 16 (illustrated in FIG. 2) which is covered by a covering film 17 adhering thereto, for example a silicone paper. The covering film 17 protrudes in the width direction (x-direction) at one end beyond the backing film 5 by a section 18 forming a tear-off aid.

The hot-melt adhesive is, for example, a Macromelt 6208 sold by Henkel. The casing 11 is produced from a plastic, for example ABS, the melting point of which lies above that of the hot-melt adhesive. The backing film 5 is produced, for example, substantially from aluminium.

The hot-melt adhesive unit 1 is produced, for example, by extrusion of the two casings 11 onto the backing film 5, wherein, during this extrusion operation or subsequently, the hot-melt adhesive body 2 is applied between the casings 11 to the backing film 5. In the process, an elongate, strip-like product is produced, to the lower side of which the adhesive layer with the covering film 17 is applied. The individual hot-melt adhesive units 1 are then produced by severing or cutting from said product in the longitudinal direction (y-direction). The size of the individual hot-melt adhesive unit 1 and of the backing film 5 is, for example, approximately 20 mm×11 mm, the height of the hot-melt adhesive unit 1 is, for example, approximately 6.5 mm and the width of the hot-melt adhesive body 2 is approximately 9 mm. The hot-melt adhesive body 2 projects with the head region 4 thereof beyond the surfaces 14 of the boundary limbs 13 of the casings 11, for example, by approximately 3 mm. The casings 11 are therefore independent parts which are not an integral part of the components to be adhesively bonded.

The hot-melt adhesive unit 1 according to the invention is used, for example, as per the method known from EP 2 110 419 A1, for the initial adhesive bond in the adhesive bonding of components, for example a glass window, to a steel frame of a vehicle roof unit. In this case, a plurality of hot-melt adhesive units 1 are adhesively bonded to the glass window by the adhesive layer after removal of the silicone paper. The glass window is subsequently positioned in the adhesive bonding position thereof on the steel frame, with the head region 4 of the hot-melt adhesive bodies 2 bearing against the steel frame. When the head region 4 of the hot-melt adhesive body 2 is melted because of the heat generated on the steel frame by induction, the casings 11 and the boundary limbs 13 thereof of each hot-melt adhesive unit 1 form a minimum spacer which maintains a minimum distance of the glass window relative to the steel frame. After cooling, the hot-melt adhesive fixes the glass window until a main adhesive bond, for example brought about by means of a polyurethane adhesive, is sufficiently strong.

Figure 2:
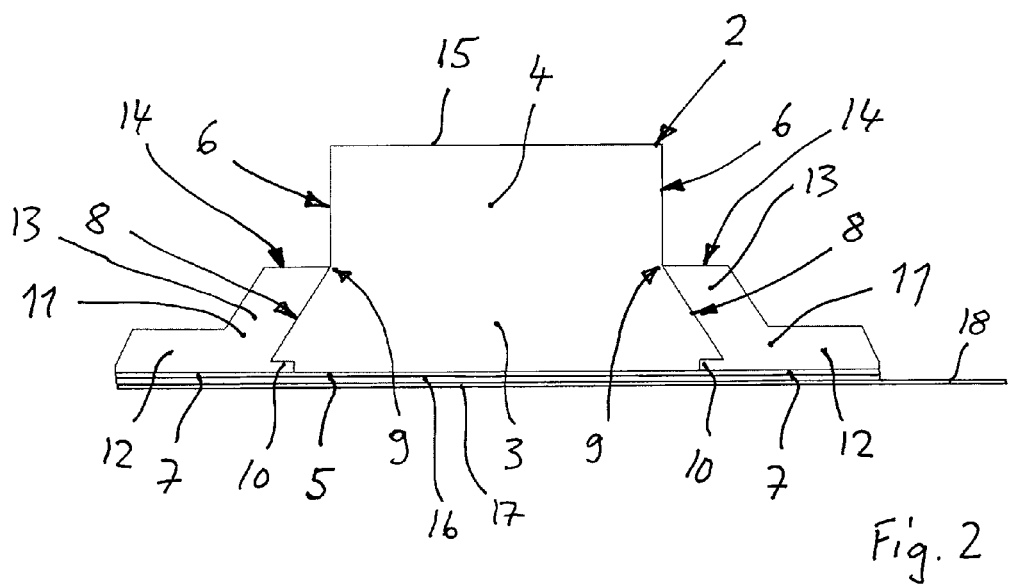
FIG. 2 shows, in a lateral top view, the hot-melt adhesive unit from FIG. 1 in an enlarged illustration.
Figure 3:
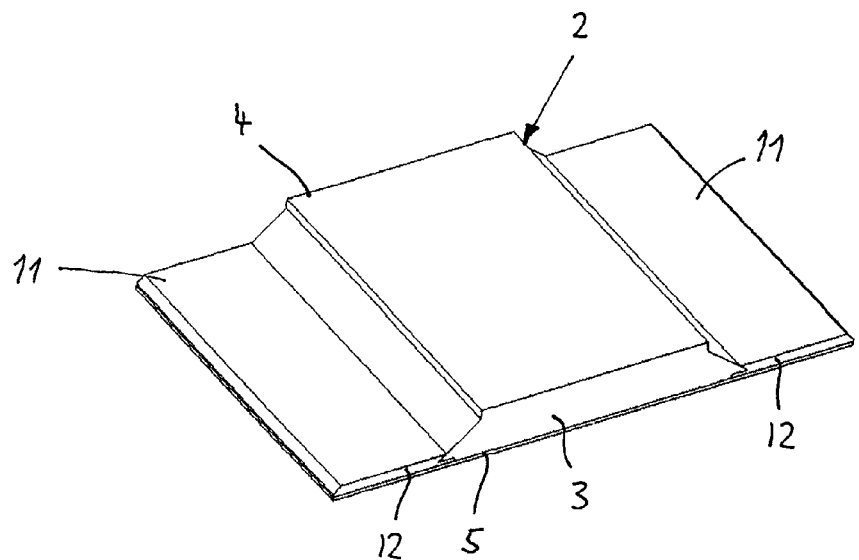
FIG. 3 shows, in a perspective top view, a second exemplary embodiment of a hot-melt adhesive unit.
Figure 4:
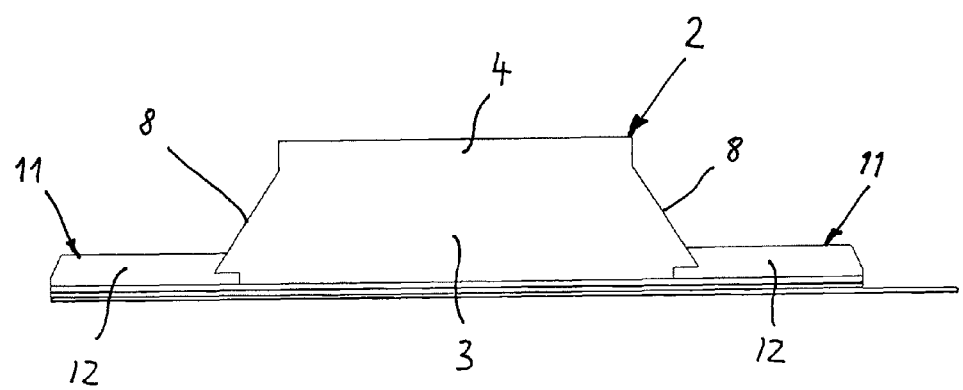
FIG. 4 shows, in a lateral top view, the hot-melt adhesive unit from FIG. 3 in an enlarged illustration.

The hot-melt adhesive unit 1 illustrated in FIGS. 3 and 4 for a different application or for a different adhesive bonding arrangement differs from the exemplary embodiment illustrated in FIGS. 1 and 2 essentially by the hot-melt adhesive body 2 having a lower height, wherein the height is, for example, 4.0 mm. Furthermore, the casing 11 bounds the oblique outer surface 8 of the base region 3 of the hot-melt adhesive body 2 merely by the height of its fastening base 12.

The exemplary embodiments illustrated contain a configuration which is rectangular in outline, in particular by severing from a strip-like intermediate product perpendicularly to the longitudinal axis thereof. The separating cuts may also take place obliquely with respect to the longitudinal axis such that the individual hot-melt adhesive units 1 can have a configuration in the manner of a parallelogram in outline. This measure can facilitate simple differentiation between different hot-melt adhesive units 1.

The individual features disclosed in the description and with reference to the exemplary embodiments and the figures can be combined in any technically expedient arrangements and configurations with the particular subject matter of the invention in the general form thereof.

The invention claimed is:

1. A hot-melt adhesive unit of an adhesive bonding arrangement for adhesively bonding a first component to a second component, the hot-melt adhesive unit comprising:
   a hot-melt adhesive body having a base region and a head region,
   the hot-melt adhesive body is at least partially bounded laterally in and in contact with the base region thereof by a casing, and projects with the head region thereof, the head region forming the adhesive bond beyond the casing,
   wherein the casing increases the stability thereof during handling and adhesive bonding.

2. The hot-melt adhesive unit according to claim 1, wherein the casing is not an integral part of the first component or the second component.

3. The hot-melt adhesive unit according to claim 1, wherein the casing is produced from a plastics material, the melting point of which is higher than the melting point of the hot-melt adhesive of the hot-melt adhesive body.

4. The hot-melt adhesive unit according to claim 1, wherein the hot-melt adhesive body is arranged with the base region thereof on a backing layer.

5. The hot-melt adhesive unit according to claim 4, wherein the hot-melt adhesive or the hot-melt adhesive body is extruded onto the backing layer.

6. The hot-melt adhesive unit according to claim 4, wherein the casing holds the base region of the hot-melt adhesive body on the backing layer by means of form-fitting engagement.

7. The hot-melt adhesive unit according to claim 4, wherein the casing has two inclined surfaces in contact with the base region of the hot-melt adhesive body, and wherein the base region of the hot-melt adhesive body widens as its extends downward to the backing layer.

8. The hot-melt adhesive unit according claim 4, wherein the backing layer on the side opposite the hot-melt adhesive body has an adhesive bonding means, in particular an adhesive layer or an adhesive tape, which is covered in particular by means of a covering which can be peeled off.

9. The hot-melt adhesive unit according to claim 1, wherein the casing bounds the base region of the hot-melt adhesive body exclusively on two opposite sides.

10. The hot-melt adhesive unit according to claim 1, wherein individual hot-melt adhesive units are strips in the form of a hot-melt adhesive strip with a casing.

11. The hot-melt adhesive unit according to claim 1, wherein hot-melt adhesive body is shaped to have at least two approximately parallel exposed surfaces, whereby a first of the parallel surfaces comes into contact with the first component and a second of the parallel surfaces comes into contact with the border region of the second component.

12. The hot-melt adhesive unit according claim 11, wherein the first of the parallel surfaces projects from the base region and the second of the parallel surfaces projects from the head region.

13. The hot melt adhesive unit according to claim 1, wherein the head region includes opposite sides and a maximum width therebetween, and the base region having opposite sides and a maximum width therebetween greater than the maximum width of the head region, and wherein the head region projects above a top boundary line of the casing and does not overlie the casing.

14. The hot melt adhesive unit according to claim 13, wherein the base region includes a first recess at a bottom of one of the opposite sides and a second recess at a bottom of another of the opposite sides, and wherein the base region has a width between the first and second recesses that is less than the maximum width of the base region.

15. The hot melt adhesive unit according to claim 14, wherein a portion of the casing is received in each of the first and second recesses of the base region.

16. A hot-melt adhesive unit of an adhesive bonding arrangement for adhesively bonding a first component to a second component, the hot-melt adhesive unit comprising:
   a hot-melt adhesive body having a base region and a head region,
   a casing, the hot-melt adhesive body being at least partially bounded laterally in and in contact with the base region thereof by the casing, and
   a backing layer including an upper surface, the base region and the casing being both disposed on co-planar portions of the upper surface of the backing layer,
   wherein the head region projects from the base region and is configured to form an adhesive bond beyond the casing.

* * * * *